(12) United States Patent
Feve et al.

(10) Patent No.: US 7,648,290 B2
(45) Date of Patent: Jan. 19, 2010

(54) MODULAR SOLID-STATE LASER PLATFORM BASED ON COAXIAL PACKAGE AND CORRESPONDING ASSEMBLY PROCESS

(75) Inventors: Jean-Philippe Feve, Le Touvet (FR); Thierry Hilt, Barraux (FR); Nicolas Landru, Meylan (FR); Magalie Maillard, Meylan (FR)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/533,000

(22) Filed: Sep. 19, 2006

(65) Prior Publication Data

US 2007/0116082 A1 May 24, 2007

Related U.S. Application Data

(60) Provisional application No. 60/718,780, filed on Sep. 20, 2005.

(51) Int. Cl.
*G02B 6/36* (2006.01)
(52) U.S. Cl. .............................. 385/93; 385/15; 385/31; 385/88; 372/92; 372/101; 372/107; 372/108
(58) Field of Classification Search ........................ None
See application file for complete search history.

(56) References Cited

U.S. PATENT DOCUMENTS

| | | | | |
|---|---|---|---|---|
| 4,665,529 A | | 5/1987 | Baer et al. ................... 372/107 |
| 4,723,257 A | * | 2/1988 | Baer et al. ................... 372/108 |
| 4,734,912 A | | 3/1988 | Scerbak et al. ................ 372/27 |
| 4,953,166 A | | 8/1990 | Mooradian .................... 372/21 |
| 5,394,413 A | | 2/1995 | Zayhowski ................... 372/10 |
| 5,675,604 A | * | 10/1997 | Durkin et al. ................. 372/75 |
| 5,909,306 A | | 6/1999 | Goldberg et al. .......... 359/337.1 |
| 6,185,347 B1 | | 2/2001 | Zheng ........................... 385/34 |
| 6,282,227 B1 | | 8/2001 | Schmitt et al. ............... 372/107 |
| 6,434,177 B1 | | 8/2002 | Jurgensen ................. 372/43.01 |
| 6,456,637 B1 | | 9/2002 | Holcomb et al. .............. 372/40 |
| 6,628,692 B2 | | 9/2003 | Kasamatsu .................... 372/70 |

(Continued)

FOREIGN PATENT DOCUMENTS

DE 19723269 12/1998

(Continued)

OTHER PUBLICATIONS

Fève et al, "Triggering passively Q-switched microlasers," in Advanced Solid-State Photonics, C. Denman, ed., vol. 98 of OSA Proceedings Series (Optical Society of America, Washington, D.C., 2005), pp. 373-378.

(Continued)

*Primary Examiner*—Uyen-Chau N Le
*Assistant Examiner*—Chad H Smith
(74) *Attorney, Agent, or Firm*—Matthew A. Pequignot; Pequignot + Myers LLC

(57) ABSTRACT

Application of a modular coaxial package design, compatible with telecommunication passive component packaging, to microchip lasers, in particular to passively Q-switched microlasers, pumped with a fiber-coupled diode, is disclosed. The number of parts is thereby reduced while providing the adequate degrees of freedom for the active or passive alignment of the optical elements within the package.

18 Claims, 13 Drawing Sheets

U.S. PATENT DOCUMENTS

| | | | |
|---|---|---|---|
| 6,754,418 B1 | 6/2004 | Holm et al. ................... | 385/49 |
| 2002/0186742 A1* | 12/2002 | Flint et al. ................... | 372/70 |
| 2004/0086226 A1 | 5/2004 | Hellman et al. ............... | 385/33 |
| 2004/0101015 A1 | 5/2004 | Butterworth ................ | 372/70 |
| 2004/0179789 A1 | 9/2004 | Shi ............................ | 385/88 |
| 2005/0280888 A1* | 12/2005 | Pan et al. .................... | 359/337 |
| 2006/0039441 A1* | 2/2006 | Aoshima et al. .............. | 372/92 |

FOREIGN PATENT DOCUMENTS

WO            93/21670          10/1993

OTHER PUBLICATIONS

Di Teodoro et al, "Diffraction-limited, 300-kW peak-power pulses from a coiled multimode fiber amplifier" Optics Letters, vol. 27, Issue 7, pp. 518-520.

J. J. Zaykowski, "Non linear frequency conversion with passively Q-switched microchip lasers", Lasers and Electro-Optics, CLEO '96, paper CWA6, 1996, pp. 236-237.

* cited by examiner

US 7,648,290 B2

MODULAR SOLID-STATE LASER PLATFORM BASED ON COAXIAL PACKAGE AND CORRESPONDING ASSEMBLY PROCESS

CROSS REFERENCE TO RELATED APPLICATIONS

This application claims priority of U.S. Provisional Patent Application No. 60/718,780 filed Sep. 20, 2005, entitled "A modular passively q-switched microlaser with controllable peak power density, coaxial package platform and assembly process" which is incorporated herein by reference for all purposes

FIELD OF THE INVENTION

The present invention relates to a coaxial packaging platform used in the manufacture of passive optical components, and in particular to an assembly process suitable for large-scale manufacturing of passively Q-switched solid-state lasers. The platform provides for pumping the microlasers through a fiber using a pig-tailed pump source and fiber output coupling.

BACKGROUND OF THE INVENTION

Conventional passively Q-switched microlasers were disclosed in U.S. Pat. No. 5,394,413 issued Feb. 28, 1995 to Zayhowski.

The pumping of microlasers by fiber-coupled pump diodes has also been widely disclosed in the prior art, including in the afore-mentioned patent.

Amplification of passively Q-switched microchip lasers was disclosed in U.S. Pat. No. 5,909,306, issued Jun. 1, 1999 to Goldberg et al., as well as by Di Teodoro et al. in 2002 (Optics Letters, 27, 518, 2002). However, these devices were based on standard microlasers with bulk packaging without fiber coupling, resulting in a large and cumbersome product. In particular, they do not capitalize on the thermal management and ruggedness of a fiberized configuration.

Several techniques for packaging passively Q-switched microlasers have been reported; for example, Holm et al. (U.S. Pat. No. 6,754,418) reported the use of a silicon microbench in order to reduce the size and cost, while providing good thermal management. However, no corresponding packaging or assembly process has been developed, so that no breakthrough was obtained in the product performance.

MegaWatt Lasers Inc. (Trussel et al., Lase 2004, presentation 5332-14) reported the packaging of passively Q-switched microchip lasers in a TO-3 package for eyesafe emission. However operation was limited to a very low repetition rate (<10 Hz). Moreover, the assembly process relied on manual dynamic alignment with subsequent gluing, and therefore was not suitable for volume production and cost reduction. The TO-3 package also did not afford output coupling through a fiber.

Pumping microchip lasers out of the absorption peak has been reported by Trussel et al. (e.g. eye-safe Yb:Er:glass, Lase 2004, presentation 5332-14). The insensitivity of the absorption coefficient to the pump wavelength allows the product to operate without temperature control. However, for a given microchip, non-optimized pumping conditions lead to very limited product performance.

While coaxial packages and associated assembly processes have been developed for fiberoptic communication components such as WDM, filters, attenuators, to date no attempt has been made to apply them to solid-state lasers.

A laser diode pumped solid state laser with miniaturized quick disconnect laser head, disclosed in U.S. Pat. No. 4,665,529, issued May 12, 1987 to Baer et al, comprises an extended cavity with a large number of mechanical parts and complex geometries, which do not favor manufacturing cost reduction. The mechanical parts also do not offer the degrees of freedom for adjusting the focus of the pump diode or for adjusting the relative lateral position of the different optical parts. No provision has been made for coupling into an output fiber, so there is no opportunity to build a versatile product platform on this technology. The quick-disconnect fiber connector also provides poor positional accuracy, which could be detrimental to the performance of a passively Q-switched microchip laser, where output performance parameters are directly related to the pump intensity. As a consequence, the disclosed design may not be directly applied to pulsed microchip lasers.

A continuation of the same idea is disclosed in U.S. Pat. No. 4,723,257, issued Feb. 2, 1988 to Baer et al, including the possibility of using monolithic laser cavities, removing the focusing optics, using the quick-disconnect connector on the pump diode side, and using arrays of pump diodes or broad area pump diodes. While this arrangement may be satisfactory in C.W. lasers, it is not directly applicable to pulsed microchip lasers.

In the case of a microchip laser cavity, the laser mode is no longer fixed by the cavity geometry but only depends on the pump beam focusing. The accurate control of the position of the different elements (input fiber, focusing optics, microlaser) is then critical for the stability and reproducibility of the laser performance. From this point of view, the present invention offers important advantages compared to those disclosed in the above two patents.

U.S. Pat. No. 6,282,227 issued Aug. 28, 2001 to Schmitt et al, discloses a diode-pumped frequency doubled solid-state laser operating in C.W. with intra-cavity frequency doubling. Schmitt discloses the use of a monolithic metallic part to improve the mechanical stability and thermal management, which is not directed toward (and not compatible with) the reduction of cost and size of the laser head.

In U.S. Pat. 6,434,177, issued Aug. 13, 2002 to Jurgensen, a solid-state laser with one or several pump light sources is disclosed, wherein a specific optical part is used to increase the pump power of a solid state laser by combining several pump diodes (or arrays). Jurgensen discloses corresponding coupling schemes. The cylindrical package disclosed is monolithic, so that it offers no degree of freedom for adjusting the relative position of the optical parts (focusing, resonator). It should also be noted that it is limited to C.W. lasers with extended cavities, and could not be applied to microchip lasers for all the reasons described before (see U.S. Pat. No. 4,665,529 for example). In addition, output fiber coupling is not considered.

Further, a solid-state laser device based on a tubular housing containing a passively Q-switched microchip laser for generating the fourth harmonics has been described in "Conference on Lasers and Electro-optics (CLEO), p.236, paper CWA6, 1996". In this conventional solid-state laser device, an optical fiber is connected to a Nd:YAG laser crystal, a Cr:YAG saturable absorber crystal as Q switch element and a KTP crystal.

While the arrangement of optical elements in the cylindrical housing is quasi-monolithic, no degrees of freedom are provided for alignment of the optical parts. No focusing optics is included for the pump beam, and no fine adjustment of the fiber end position is provided. Accordingly, as described previously, the stability and reproducibility of the laser performance will be considerably limited. As no output fiber coupling is provided, there is little opportunity to build a versatile product platform based on the disclosed technology. Also, optical adhesives are used for the assembly of the optical parts. In the case where ultraviolet laser radiation is generated, deposition of organic contamination under UV light may limit the reliability of the laser, because all optical parts are exposed, being located in the same housing.

U.S. Pat. 6,456,637, issued on Sep. 24, 2002 to Holcomb, discloses the use of two pump wavelengths, from each side of the absorption peak, in order to improve thermal stability of the laser or amplifier. This embodiment relies on a very accurate choice of the pump wavelengths, which in turn requires accurate sorting of the pump diodes. A lower yield in the process will result due to the higher number of rejected parts, thereby increasing the manufacturing cost. In contrast, an aspect of the present invention is based on using a pumping wavelength far from the absorption peak, in a spectral range where the absorption is quasi-insensitive to the pump wavelength, so that no sorting of the pump diodes is needed. As a consequence, the combination of optimized pumping efficiency and off-resonance pump wavelength helps achieve acceptable laser performance over a wide range of temperatures.

Another disclosure of off-peak optical pumping appears in U.S. Patent Application 20040101015A1, published Sep. 8, 2005 by Lefort et al., which is directed to reducing thermal stresses in Nd:YVO$_4$ (yttrium orthovanadate) crystals or rods as a result of end pumping with light at the peak-absorption wavelength of about 808 nm. Such stresses can fracture the laser crystal under strong pumping. More specifically, the pump wavelength is chosen so that the absorption is quasi-isotropic, which is not the case at resonance where the strong anisotropy leads to uniaxial stress and cleavage. However, no reference is made to the temperature dependence of the laser performance. The result is achieved by optically end-pumping at a wavelength at which the absorption is less than about 35% of the absorption at 808 nm, a preferred wavelength range being between about 814 and 825 nm.

A diode pumped Nd:YAG laser is disclosed in U.S. Pat. No. 4,734,912, issued Mar. 29, 1988 to Scerbak, wherein a YAG rod optical resonator coated on its ends is made sufficiently short, i.e., 1 mm, so that it will support only two axial resonant (lasing) modes. The rod is transversely stressed to polarize the two original modes and to excite a third lasing mode orthogonally polarized to the first two modes. The third mode is separated from the first two modes to provide stable, single mode TEM$_{001}$ output. The transverse stress is applied by means of a spring clamp made of a material, Be—Cu, having a low temperature coefficient.

In the case of U.S. Pat. No. 4,953,166, issued Aug. 28, 1990 to Mooradian, mechanical stress is applied to tune the short resonant cavity having a free spectral range larger than the gain bandwidth, for example thermally or by the application of a longitudinal or transverse stress. The position of the longitudinal mode with respect to the gain curve is adjusted to control all output performance.

In summary, no disclosures have been in made in prior art for a low-cost, high reliability, high performance platform for manufacturing passively Q-switched lasers which are directly compatible with existing optical telecommunication fiber-coupled components.

An object of the present invention is to overcome the shortcomings of the prior art by providing a solid state laser platform wherein there is a reduction of size, reduction of power consumption, broadening of operating temperature range, reduction of product cost, including reduction of labor hours (current processes are based on manual assembly with active alignment), availability of output through a fiber, amplification of pulses (either in bulk or in fiber amplifiers) to increase output power, generation of new wavelengths (with frequency conversion crystals) and add-on modules (controllable attenuators or switches, monitor photodiodes, etc.).

Most of these issues are related to the laser packaging. A smaller size leads to lower passive heat load, reduced power consumption for thermal management and/or a broader operating range; a package with fiber output also permits the use of a fiber amplifier, with the associated higher output power facilitating the generation of new wavelengths; and a suitable design of the package that helps to leverage existing assembly processes for cost reduction.

SUMMARY OF THE INVENTION

Diode pumped solid state microlasers are attractive sources of laser radiation due to their compact size and high output power capability. Their structure lends itself to mass fabrication so that robust, compact and low-cost products can be manufactured. A particularly interesting case is the passively Q-switched microlaser, which emits high peak power, and facilitates efficient harmonic generation.

An object of present invention is to apply a modular coaxial package design, compatible with existing telecommunication components, to microchip lasers, in particular to passively Q-switched microlasers, pumped with a fiber-coupled diode, thereby reducing number of parts while providing the adequate degrees of freedom. The invention encompasses not only the opto-mechanical design but also the corresponding assembly and fabrication process.

It is a further object of the invention to provide for a package design that offers the minimum degrees of freedom, but still allows for decoupling the critical parameters for laser performance. In particular, based on specially designed packaging that induces anisotropic losses within a globally cylindrical geometry, the disclosed invention separates the control of the polarization from thermal management. This decoupling of thermal management from polarization control, combined with a reduced passive heat load of the small-size package, minimizes the need of thermal regulation of the entire laser module. In addition, the choice of suitable degrees of freedom also permits a fully passive assembly process of the laser.

It is a further object of the invention to provide a design of coaxial packaging platform, which allows output coupling of a microchip laser output to a fiber to facilitate optical coupling to fiber amplifiers, non-linear optical frequency conversion elements and other compatible components, including the case where the output fiber is part of an optical amplifier.

Still another object of the invention is to provide for adding filters, isolators, nonlinear crystals for optical frequency conversion and other optical elements within the same housing as the microlaser.

Another object of the package in the invention is to provide for the minimum and adequate degrees of freedom for optimizing the conversion efficiency of nonlinear optical frequency conversion with minimum number of parts and compatible with the coaxial geometry of the laser.

It is a yet another object of the invention to provide a hermetically sealed sub-module for UV generation.

The various features of novelty, which characterize the invention, are pointed out with particularity in the claims annexed to and forming a part of this disclosure. For a better understanding of the invention, its operating advantages and its specific objectives attained by its use. Reference should be had to the accompanying drawings and descriptive matter in which there is illustrated and described a preferred embodiment of the invention.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

Exemplary embodiments of the invention will now be described in conjunction with the drawings.

FIG. 9 is a cross-sectional view of a module wall displaying an exemplary hermetic coaxial package for reliable generation of ultraviolet light, also used as feed-through.

DETAILED DESCRIPTION OF PREFERRED EMBODIMENTS

The present invention relates to the application of coaxial packaging techniques to diode-pumped passively Q-switched microchip lasers.

Figure 1:
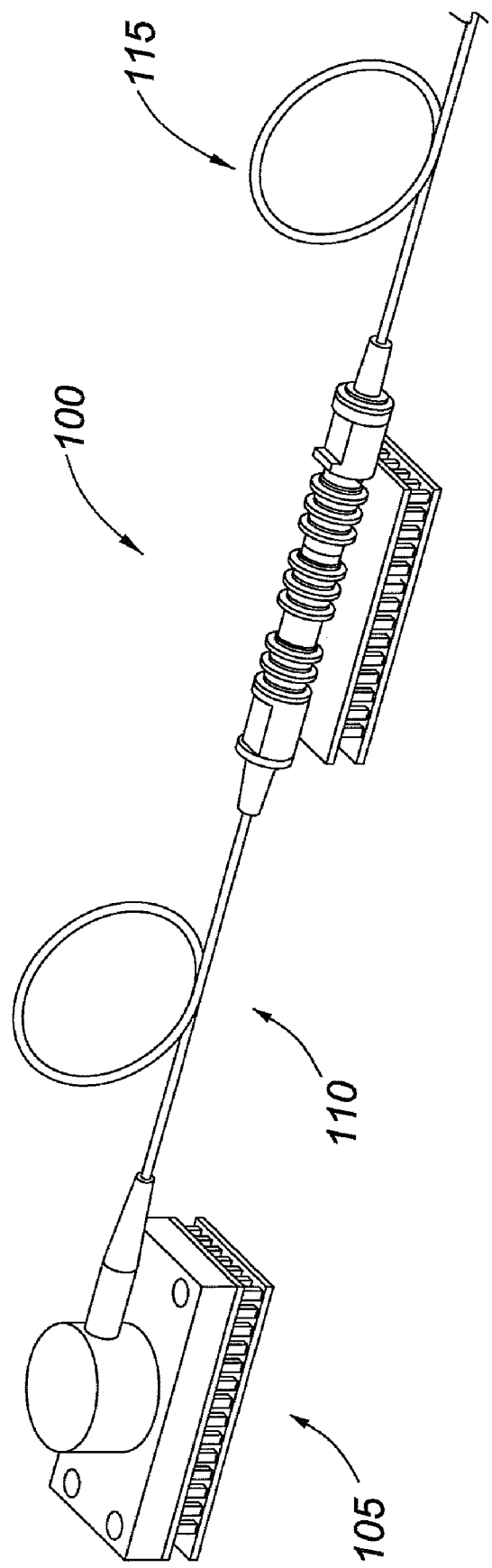
FIG. 1 depicts a general optical scheme consisting of a fiber-coupled pump diode, microlaser housed in coaxial package and fiber output.

FIG. 1 shows an exemplary application of the present invention, in which a microlaser mounted within a coaxial package 100, receives pump energy from a fiber-coupled laser diode source 105 (e.g. L3 pump module) through fiber 110. The resulting output from the microlaser 100 is coupled into fiber 115, which is available for further application to an optical amplifier, distributed temperature sensing or generation of supercontinuum, or similar.

An advantage of the disclosed coaxial packaging 100 is to simplify the use of the fiber-coupled pump diodes 105, leading to a more homogeneous pump beam, which then provides near-optimal pumping of the microlaser 100.

In addition, the use of a coaxial packaged microlaser 100 in conjunction with standard communication components brings benefits through volume cost reduction. The microlaser 100 thus becomes a part of a modular platform, which allows the connection of other modules to the laser 100, such as controllable attenuators or switches, splitters or monitor photodiodes, using existing components.

Figure 2:
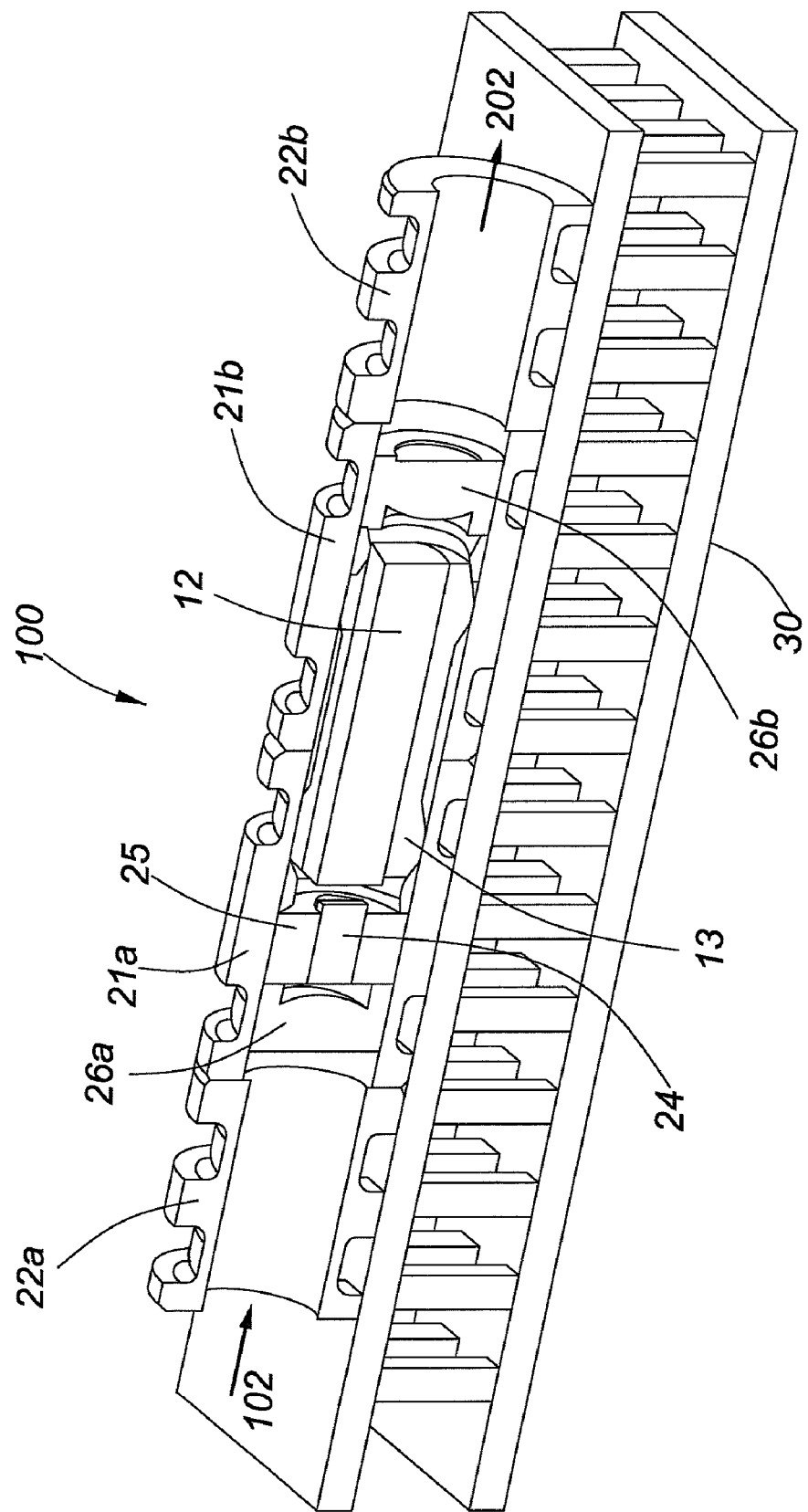
FIG. 2 is a cross-sectional view of a coaxial package housing a microlaser and nonlinear crystal.

The underlying principle behind the present invention is exemplified in FIG. 2, in which the package 100 comprises four tubular segments, two inner segments 21a-b and two outer segments 22a-b, which are attached to each other in a generally coaxial manner. The number of tubular segments can vary, but typically will lie between two and six, depending on the particular application for which the laser has been designed.

The tubular segments 21a-b, 22a-b can generally have a flat mating surface on each end, which can be perpendicular to the axis of the tubular segment. On the other hand, the flat mating surfaces may be inclined at a small acute angle away from perpendicular so that angular alignment (also known as clocking) is permitted by relative rotation of two mating tubular segments.

For instance, one end of the inner tubular segment 21a, which accommodates a monolithic cavity of microlaser 24 held in an annular holder 25 and a lens 26a, is brought into contact with an end of the outer tubular segment 22a, which accommodates a fiber end holder (not shown). During assembly, tubular segments 21a and 22a are actively aligned by relative transverse translation, typically by automated robotic holders, while the optical output from the microlaser 24 is being monitored. Once the desired output characteristics have been attained, the flat mating surfaces of segments 21a and 22a are bonded together by welding, adhesion or other suitable means. Similarly the attachment of the inner segment 21b to the other end of the inner segment 21a is performed, followed by the outer segment 22b to the other end of the inner segment 21b until a particular configuration has been completed. In an alternative approach, the above dynamic optimization can be replaced by a simple passive alignment of the segments 21a and 22a, using alignment jigs. Pump power is coupled into the package by optical fiber through port 102, while the microlaser output is coupled out of the package through port 202 by means of attaching suitably constructed fiber end holders such as ferrules.

For some applications the lenses 26a or 26b may be mounted in the outer tubular segment 22a or 22b respectively, or omitted completely, so that, for instance, the input fiber is butt-coupled to the microlaser 24. Further details of these processes will be presented below.

One important advantage of the coaxial package according to the present invention is to leverage existing parts, tooling and assembly stations. In the example of FIG. 2, the optical parts, e.g., and their submounts are placed in cylindrical housings, e.g. tubular segments 21a, 21b, 22a and 22b, and positioned at the required separations with the help of appropriately dimensioned washers. The different cylinders are then adjusted relative to each other (lateral positioning), either in a fully passive process, or preferably with dynamic optimization (under laser emission). In particular, adjustment of the longitudinal position of the fiber output can be optimized by monitoring the output power. The crystal holder 13 displayed in FIG. 2 supporting the nonlinear crystal 12 transforms the lateral adjustment of inner segment 21a relative to inner segment 21b into an angular adjustment, which allows the conversion efficiency to be optimized with the same alignment procedure. After the different alignment steps are completed, the parts are fixed in place by laser welding. The laser settings (temperatures of the different parts, drive current of the pump) are adjusted as a final step by optimizing the stability of the laser.

An additional advantageous embodiment is disclosed in FIG. 2, where the microlaser 24 is placed into a holder 25, which is a mechanical flexure that applies a fixed stress. This creates anisotropic optical properties, which are conducive to producing polarized output. However, further embodiments can be implemented where the microlaser 24 is mounted in a holder 25, which makes contact with only two opposite lateral surfaces to create a uniaxial thermal gradient in the microchip with resulting anisotropic optical properties, such as refractive index gradient. For applications that do not require polarized output beam, a simpler holder can be designed.

Depending on the desired polarization of the output, polarization maintaining fibers can be used instead of standard fibers 115 in FIG. 1.

Figure 3:
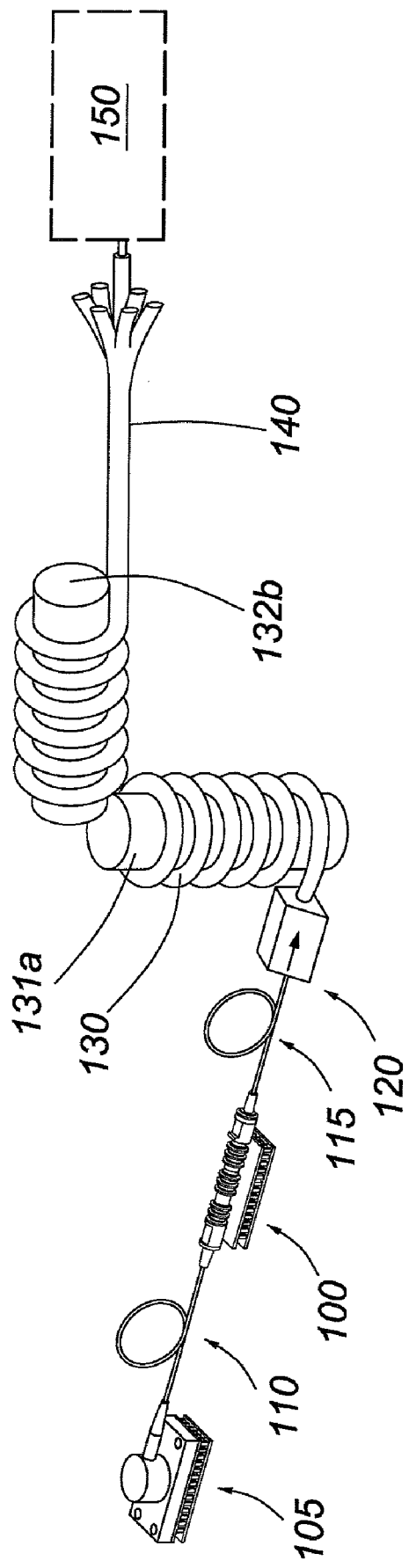
FIG. 3 is a general schematic of coaxially packaged microlaser with a fiber amplifier.

A particularly important embodiment of the present invention is the use of microchip lasers as a seed source for fiber amplifiers, for example as is illustrated in FIG. 3. A microlaser mounted within a coaxial package 100 providing a seed wavelength at 1064 nm, receives pump energy from a fiber-coupled laser diode source 105 (e.g. L3 pump module) through fiber 110. The resulting output from the microlaser package 100 is coupled into, for example, a double clad Yb-doped multimode optical amplifier fiber 130 via fiber 115 and isolator 120. Other special fiber designs could be used for the multimode optical amplifier fiber 130 as well. The multimode optical amplifier fiber 130, coiled around two mandrels 131a, b in order to produce single mode output, may be pumped by several L3 sources emitting at 940 nm, for instance, through a tapered bundle combiner 140. Optionally, a non-linear optical crystal 150 may be used to obtain higher harmonics of the 1064 nm wavelength produced by the microlaser in coaxial package 100, such as 532 nm and 212.8 nm.

This approach has proved to be a very unique way to generate high average power/high peak power laser beam. Actually, the short pulse duration of passively Q-switched lasers is particularly suited for reducing nonlinear effects that usually limit the peak power in fiber amplifiers (Di Teodoro et al, Optics Letters 27, 518, 2002). As a consequence, a large mode area fiber amplifier seeded by a fiber-coupled microchip laser is an original approach for high power laser with optimum beam quality. In this context, proper packaging is particularly relevant, because it facilitates taking full advantage of the benefits of interfacing to fiber lasers for easy thermal management, ruggedness, small size. Such high power sources are also ideal pump sources for generating new wavelengths (harmonics or others) in nonlinear crystals.

The coaxial packaging is applicable to many different designs of microlaser, irrespective of which materials are used for gain medium and saturable absorber or the pump wavelength (e.g. emission at 1064 nm or around 1535 nm, different repetition rates, etc.). It also accommodates nonlinear crystals for the generation of harmonic wavelengths. Similarly, wavelength conversion through Raman shift in the laser medium itself or in a separate material can also be considered in a coaxial package. This is particularly true with passively Q-switched self-Raman laser based on vanadate crystals (e.g. Chen, Optics Letters, 29, 1251, 2004).

In addition, the same platform will accommodate solid-state lasers for continuous wave emission, in particular microchip lasers. One such example is the generation of 532 nm by diode-pumped neodymium-doped vanadate microlasers with intracavity harmonic generation (microchip produced by JDSU-Casix).

Thus the coaxial package will allow improved pumping and cost reduction, which are two key benefits for such a product. Compared to existing microlaser products, the modular approach allows a small overall size of the product to be maintained, including heatsinks and laser controller.

Figure 4:
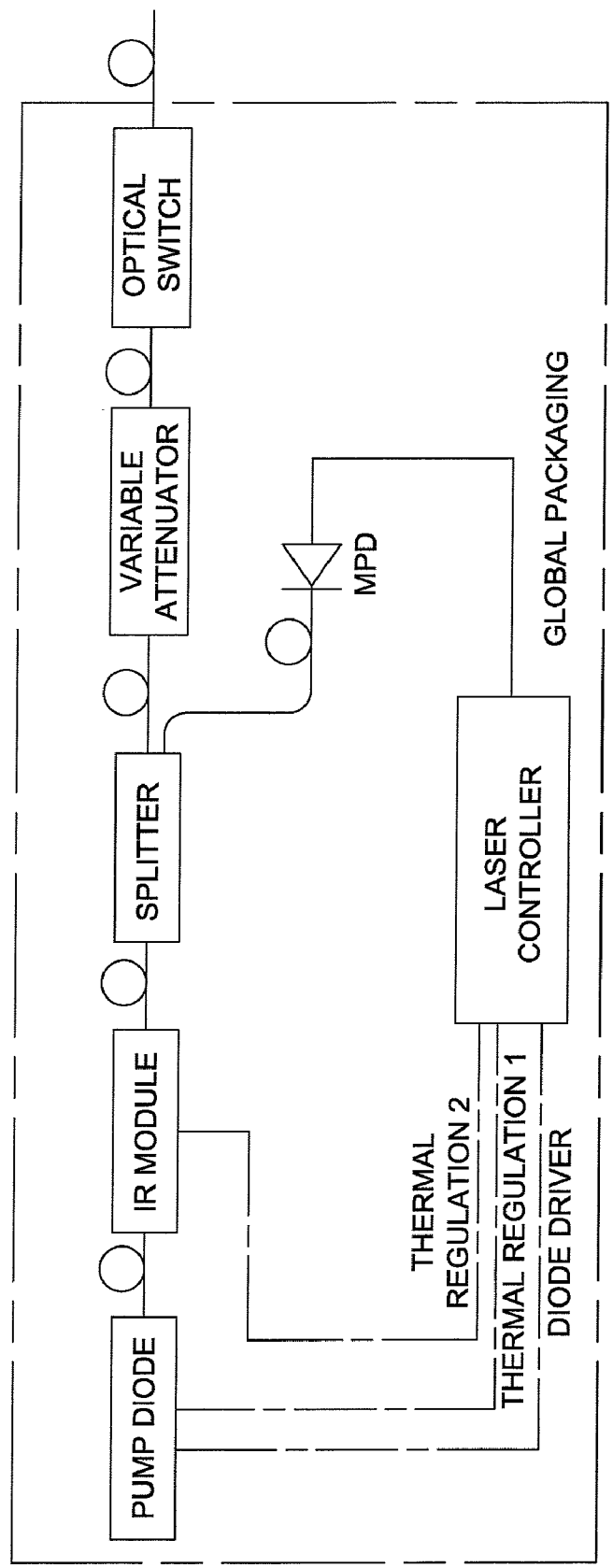
FIG. 4 shows a schematic example of add-on modules.

The modularity of systems enabled by present invention is demonstrated with an example shown in FIG. 4. Six optical fiber-coupled components are seen to comprise a system: pump diode, a microlaser in an IR module, a splitter, a monitor photodiode (MPD), a variable attenuator and an optical switch. The six components share a global package with a laser controller and driver, as well as two thermoelectric coolers for thermal regulation.

Figure 5:
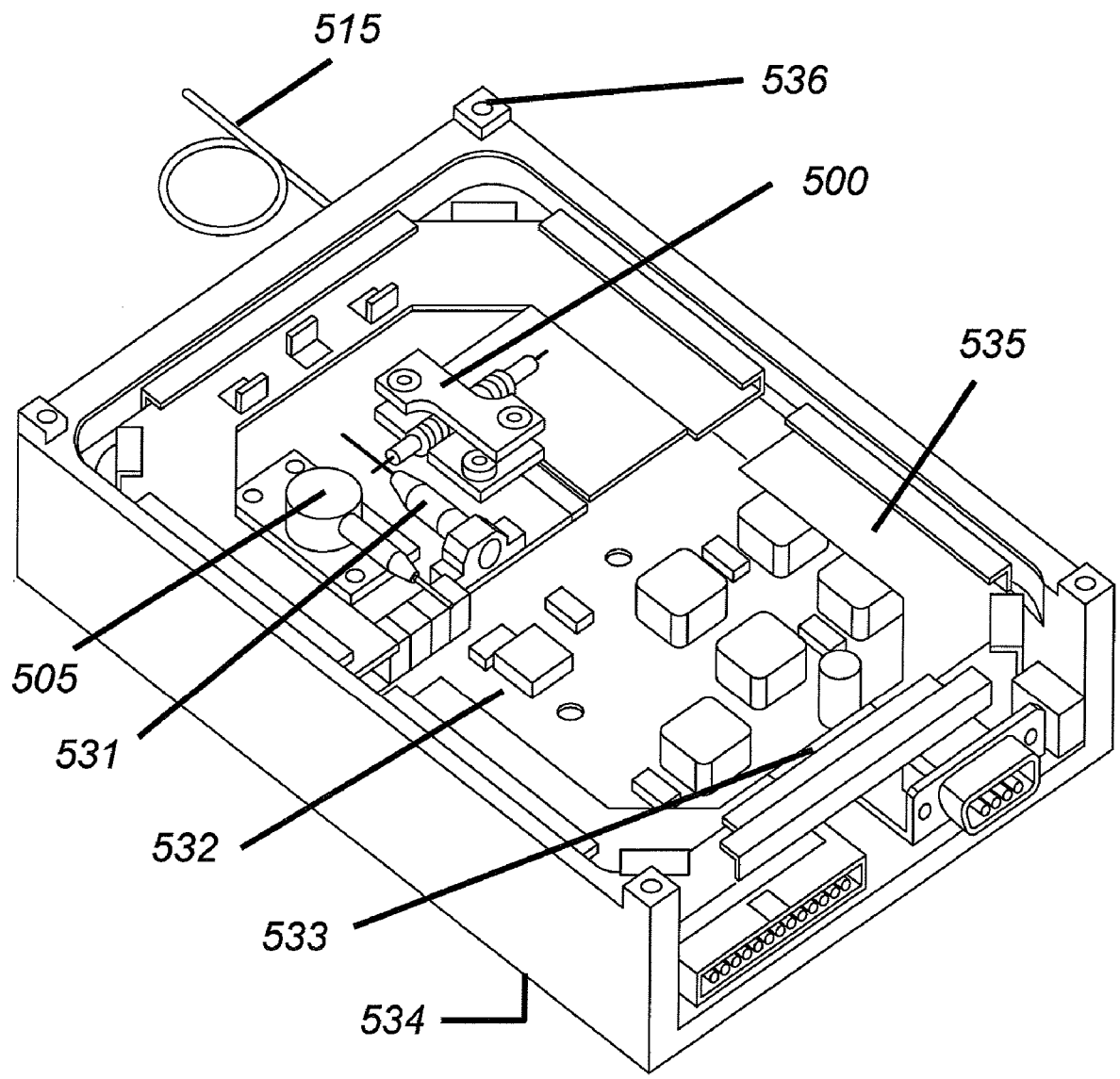
FIG. 5 is an isometric view of a fully packaged microlaser product, including pump diode, controller and heatsinks.

FIG. 5 is an isometric view of a possible arrangement of the components described in FIG. 4 into a global package. Infrared (IR) module containing microlaser in coaxial package 500 is pumped by pump diode 505. Monitor photodiode (MPD) 531 provides feedback to the laser controller 532 from the IR module 500. An optional passive component 533 can be accommodated on the fiber guide 535. The top-side 534 of the global package is suitably finished for mounting a cooling device. The global package module can be fixed into position using mounting holes 536.

The modularity of this platform allows lasers to be designed for many applications and markets. For passively Q-switched lasers, examples are: excitation of fluorensence (detection of biohazard, analysis of liquid or solids), ranging (time-of flight, possibly with 3D scene acquisition), display, material processing, distributed temperature sensing, pollution monitoring.

Fiber coupled pump diodes add certain advantages as compared to the usual broad area pump diodes: higher quality of the pump beam (homogeneous round beam profile and lower divergence) and a non-polarized pump beam, which bring an important benefit of the coaxial package for the optimization of microlaser pumping and improved beam quality of the generated laser beam.

Figure 6:
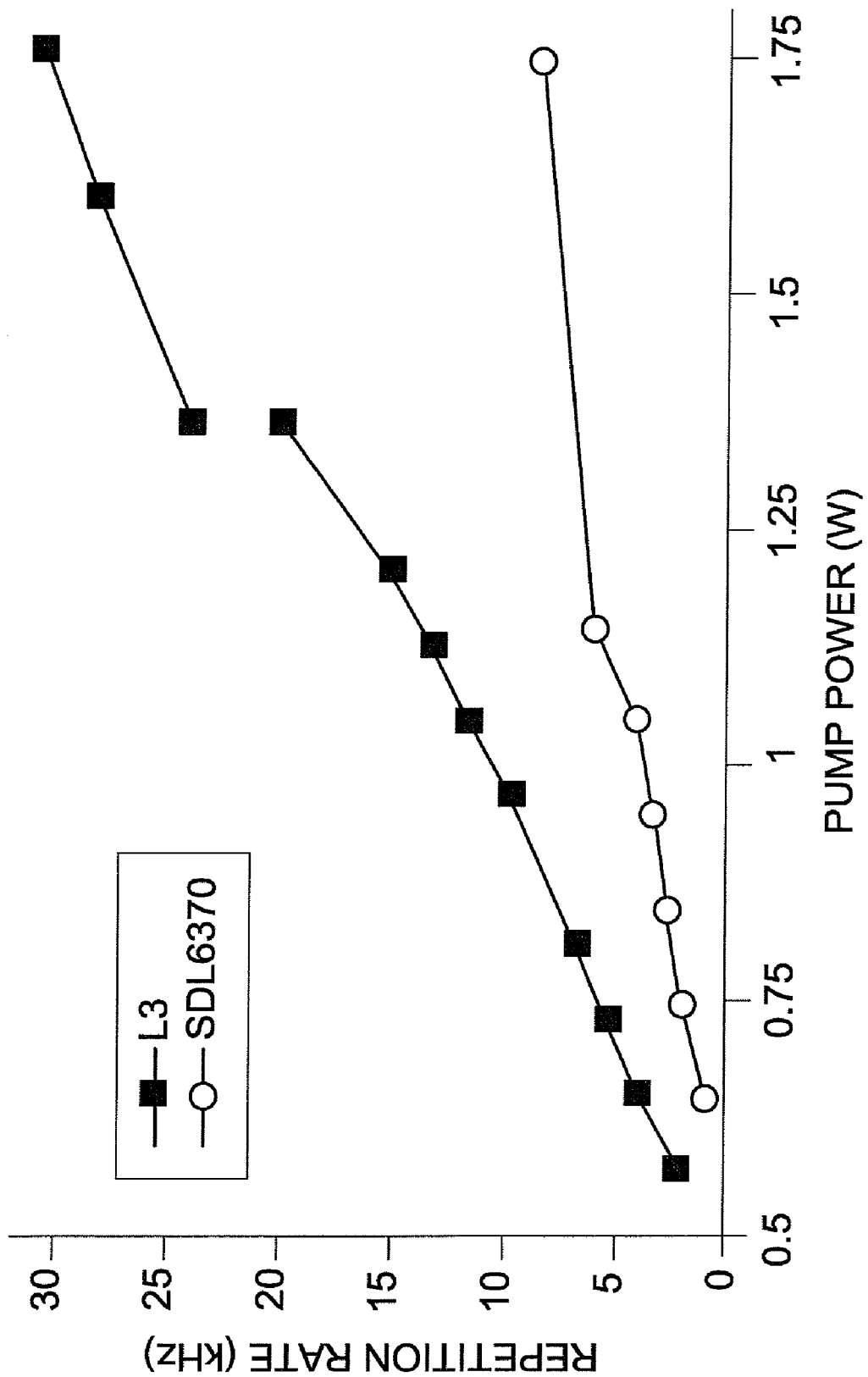
FIG. 6 is a graph of pulse repetition rate of the output laser beam versus pump power.

FIG. 6 shows the results of one such experimental comparison between a fiber-coupled pump diode at 930 nm (L3 module, fiber 50 μm, 0.2NA) and a broad area pump diode at 972 nm (SDL6370, 1 μm×100 μm). The same microchip with $Co^{2+}$:$MgAl_2O_4$ as saturable absorber, Er:Yb phosphate glass as gain medium producing emission at 1535 nm was used for both pump sources under fixed focusing conditions (ball lens diameter 2 mm).

In passively Q-switched lasers, the repetition rate is proportional to the absorbed pump power (for a given microchip, laser threshold is reached faster for higher pump power). In Yb:Er glasses, the absorption of the active laser medium is lower at 930 nm than at 972 nm (by approximately 50%), so that the absorbed pump power is lower. As a consequence, the repetition rate should be lower for a given pump power. The results of FIG. 6 clearly demonstrate the benefits of a fiber-coupled pump diode. The circle points denote the repetition rate with the broad area pump diode, the square points with fiber-coupled pump diode.

The higher beam quality and the lower divergence of the pump beam in the microchip leads to a better overlap between the pump beam and the laser-mode compared to the broad area diode, so that the pump beam absorbed in the useful volume is larger. When averaged along the cavity length, the lower divergence of the pump beam results in higher pump intensity and smaller pumped volume.

The impact on pulse energy, which primarily depends on the excited volume of the laser mode, is confirmed by the values measured in the example above: 4 μJ for L3 pump fiber-coupled diode and 8-9 μJ for SDL6370 broad area pump diode, independent of pump power.

Figure 7:
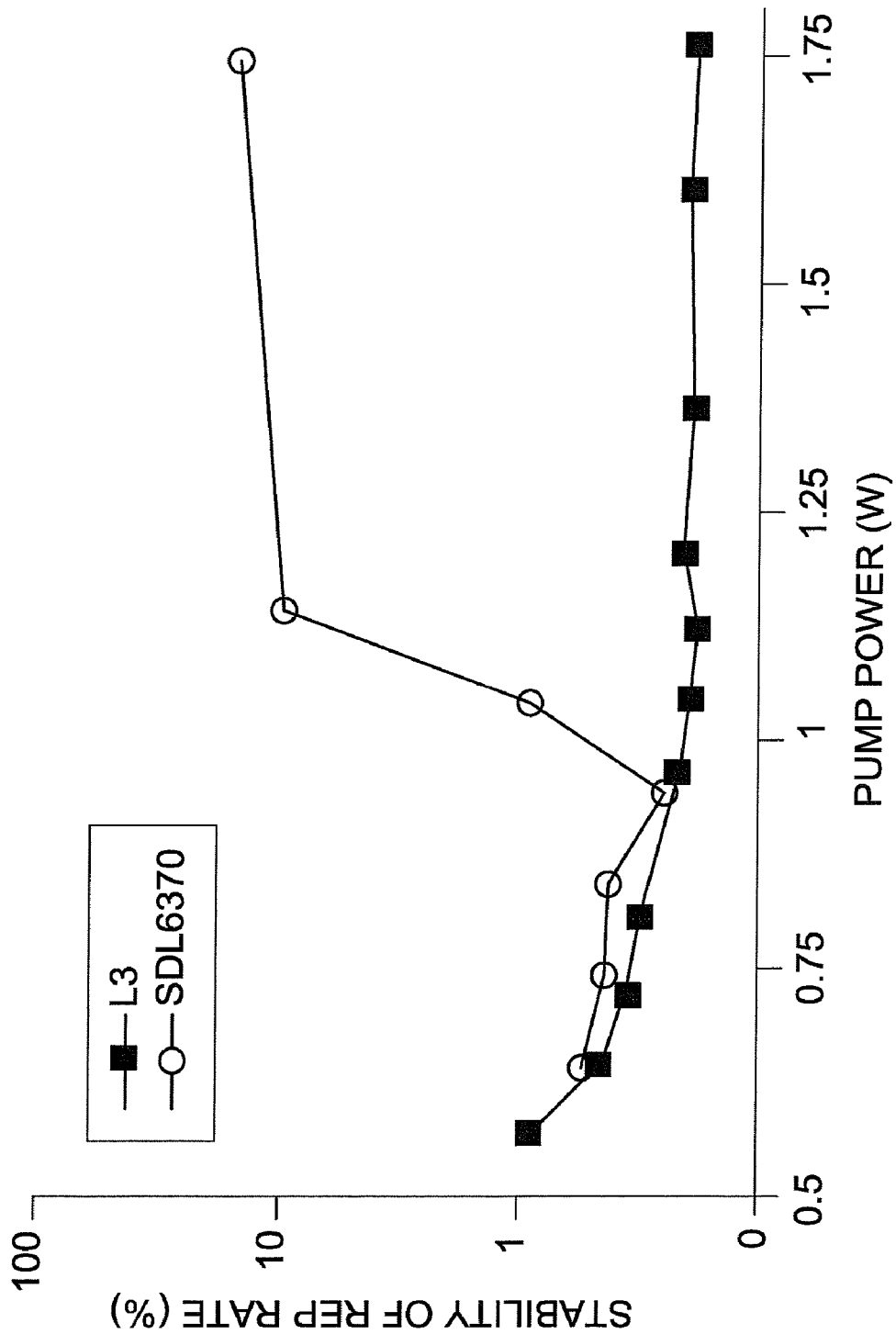
FIG. 7 is a graph of relative stability of the repetition rate versus pump power.

The lower divergence also has a major impact on the stability of the microlaser. The smaller pumped volume limits the possibility for higher order transverse modes to oscillate, thereby avoiding typical timing jitter due to competing modes, as seen from FIG. 7. The square points plotting the fiber-coupled pump laser stability of repetition rate remain at low levels for the whole pump power range, whereas for the broad area pump diode a more than ten-fold increase of instability becomes evident for pump powers in excess of 1 Watt.

In contrast, the pulse duration primarily depends on the design of the microchip (cavity length and losses), so that pump beam quality has negligible effect. In the above example, the measured pulse duration is 3.3 ns irrespective of pump diode type and pump power.

Figure 8:
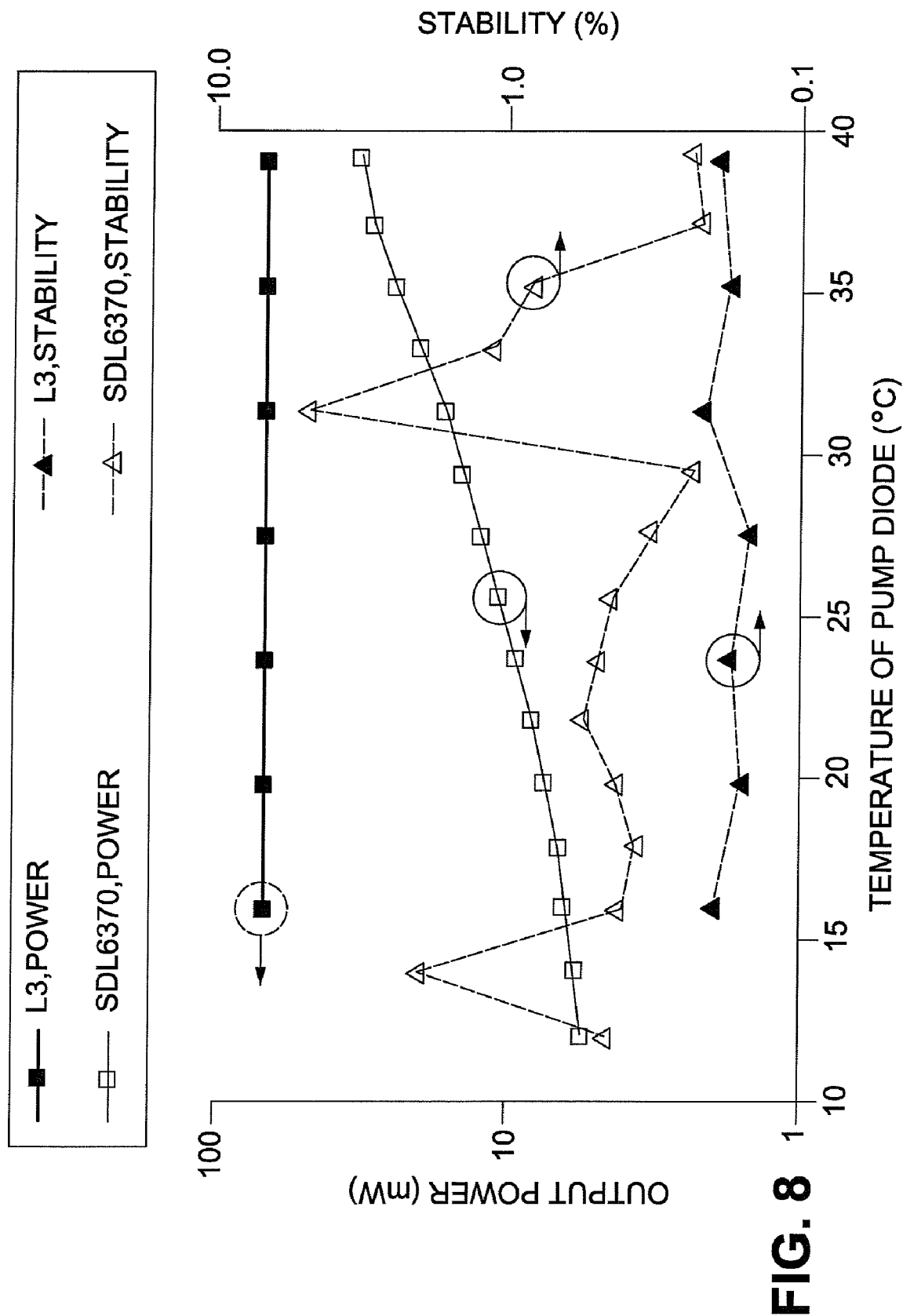
FIG. 8 is a graph of laser performance variation versus temperature of pump diode (pump wavelength shift: 0.3 nm/° C.).

Because using a pump with better beam quality allows the performance to be better optimized, the microlaser may be pumped by an off-resonance pump wavelength. In the case of Yb, Er dopant materials, one additional benefit of such pumping (such as 930 nm) is a much lower sensitivity of laser performance to pump wavelength variations, as shown on FIG. 8. Actually, the absorption of these materials is quasi-constant around 930 nm, compared to the well-peaked behavior at 975 nm. Consequently, accurate control of the pump diode temperature is not needed at 930 nm. This approach is of particular interest for minimizing the power consumption of the overall laser module.

A lens may be used for imaging the pump fiber output into the microchip (as shown, for instance, in FIGS. 2 and 9-13). Different types of optics may be used, for example ball lenses, aspheric lenses or doublets, gradient index lenses, etc. The magnification of the focusing optics controls the pump spot size. As explained above, this permits the output performance of the laser (repetition rate, pulse energy) to be adjusted for a given design of the microchip.

A particular situation of interest is direct coupling of the pump fiber output into the microlaser, which gives a simple and compact design, but with different performance because the pump beam diverges into the cavity. As an example, the microchip tested above was pumped with the same L3 module, but without the ball lens by placing the fiber output in close proximity of the entrance face of the microlaser. This results in stable oscillation. For a pump power of 1.3 W, the repetition rate is 12.3 kHz and the pulse energy 5.42 µJ, compared to 18.15 kHz and 3.67 µJ with similar pump power and the 2 mm diameter ball lens). The average output power is similar in both cases, 66.7 mW.

In another embodiment, the pump diode can be modulated in order to control the repetition rate of the laser beam. This approach has proved to be beneficial for some applications of passively Q-switched microlasers. Proper design of such a laser is disclosed in Feve et al, Advanced Solid State Lasers 2005, paper TuB39. These design criteria are fully compatible with the presently disclosed product platform.

Proper control of the temperature of the microlaser is essential, because it affects the frequency of the longitudinal modes, and thus all output performance parameters. The examples in FIGS. 1-5 include thermo-electric coolers (TEC) 30 for this purpose. However, in operation TECs consume a substantial amount of electric power. Depending on the target product, the number of TECs can be adapted. As described above, off-resonance pumping relaxes the need for controlling the temperature of the pump diode. Another alternative would be to use wavelength stabilized pump diodes (using Bragg gratings), and a single TEC. These two embodiments result in lower overall power consumption and a simpler electronic controller. However, platforms can also include several TECs for independent control of the temperature of the different elements (microlaser, pump diode, nonlinear crystal).

The generation of ultraviolet (UV) laser light places higher demands on the reliability of the product. In practice, deposition of contamination on the optical surfaces is assisted by UV illumination, which generally results in shorter lifetime of the laser compared to longer wavelength operation. A standard approach for solving this issue is to eliminate all possible sources of organic contamination by hermetically sealing the laser head. This complicates the design and increases the cost of the product.

Figure 9:
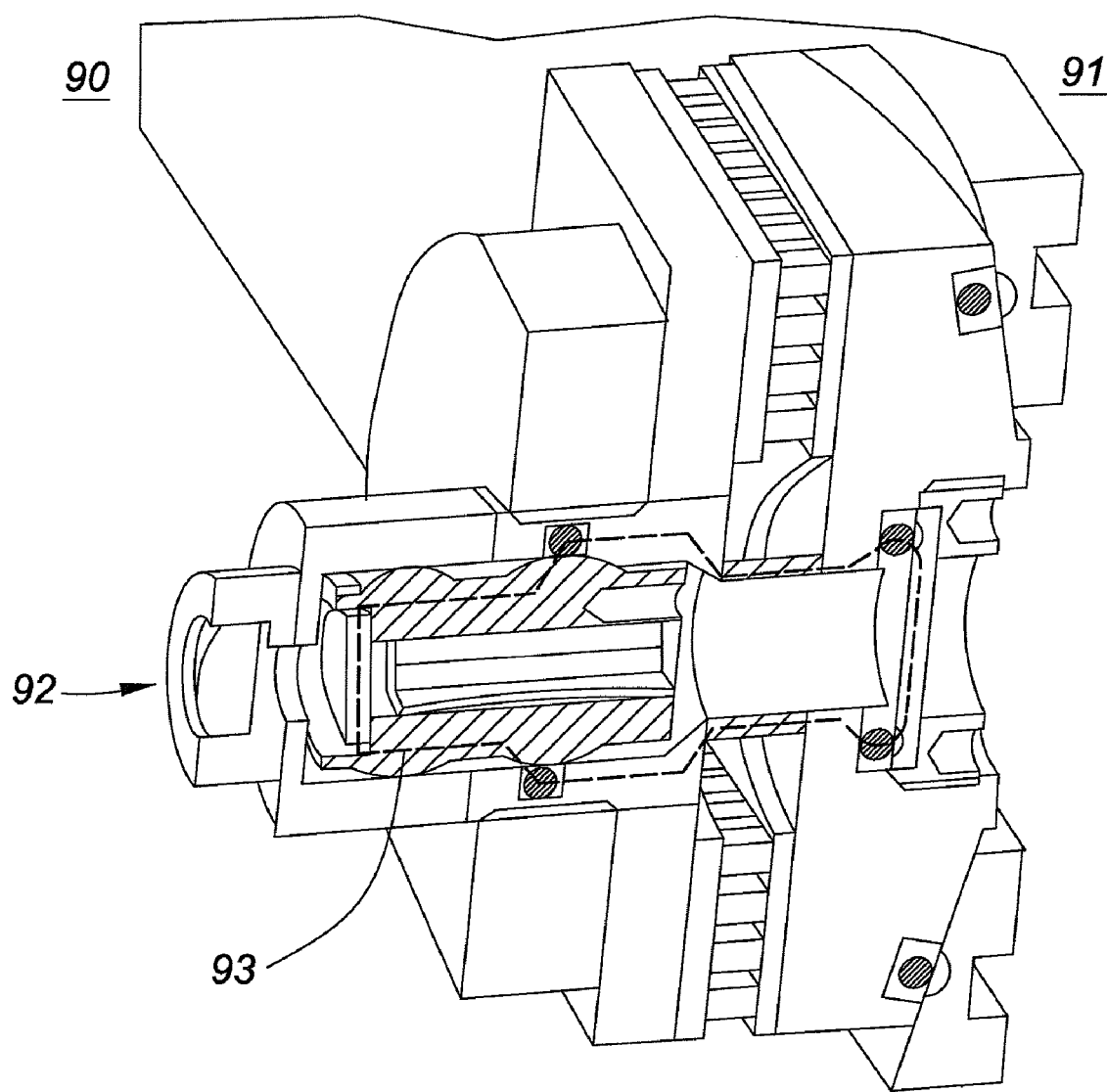

An example of one such beneficial embodiment of the modular coaxial packaging is disclosed in FIG. 9, which shows the cross-section of a module wall through which a coaxial microlaser package is used as feed-through to transfer light from inside of module 90 to outside of module 91. Hermetic sealing 93 is applied only to a very small part of the package (the housing of the nonlinear crystal), which results in much simpler package and assembly process.

One other embodiment for the generation of several harmonics from the same laser can be described. An optical splitter divides the fundamental beam into several channels, which are independently converted in optimized stages to different harmonics. The use of fiber coupled components is beneficial in this case compared to bulk optics that would complicate the system design.

Figure 10:
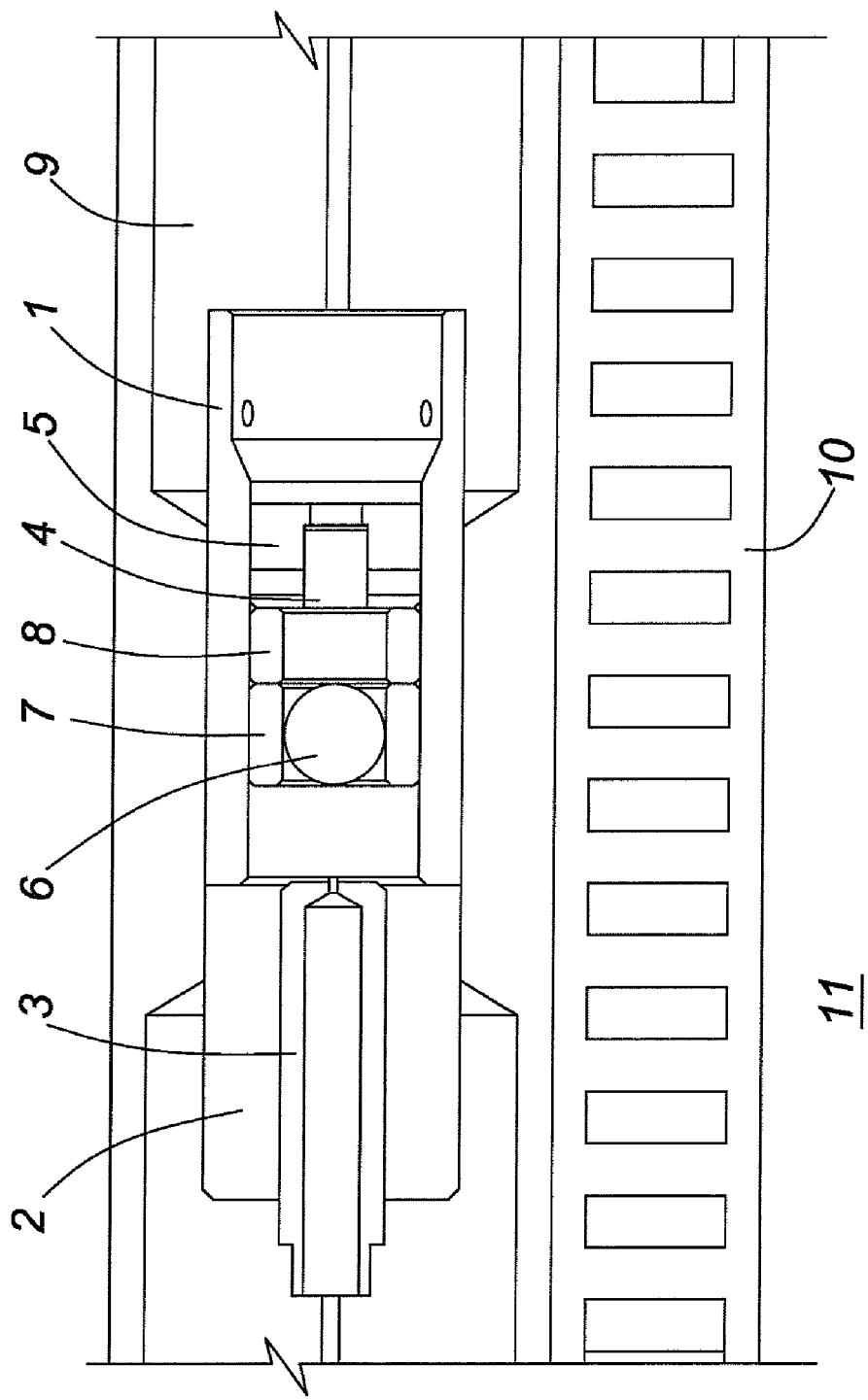
FIG. 10 is a cross-sectional view of a basic embodiment of a passively Q-switched microlaser.

FIG. 10 shows an exemplary embodiment of a basic microlaser configured in a coaxial package. A first tubular housing 1 accommodates a passively Q-switched monolithic microchip laser cavity 4 by means of annular mechanical holder 5, from which a focussing optics holder 7 holding the focusing optics (ball lens, GRIN lens, aspheric lens, etc.) is held at a predetermined distance by spacing washer 8. A second tubular housing 2 accommodating a holder 3 for the pump fiber end is attached to the first tubular housing 1 in a generally coaxial orientation. The assembly comprising tubular housings 1 and 2 is in turn housed in the laser head mount 9. The laser head mount 9 is held in thermal contact with a means for temperature control 10 (e.g. Peltier TEC) which is attached to external heatsink 11.

As an example, all non-optical parts are made of aluminum. An example of other material and dimensional details are as follows:

Housing 1 has an external diameter: 5 mm; length: 11 mm
Diameter of ball lens 6:2 mm.
Length of spacing washer: 1.4 mm
Microchip: Nd:YAG/Cr:YAG, 1 mm×1 mm×1.75 mm
Transmissivity of output coupler: 15%
Pump diode maximum power: 1.5 W @ 808 nm
Fiber diameter: 105 µm; NA: 0.15
Dimension of {laser head+Peltier element}: 15 mm×30 mm×15 mm For a pump power P=1W @ 808 nm, the optical performance of the output laser beam at 1064 nm are: repetition rate 45 kHz, pulse energy 4.5 µJ A preferred method of assembling the laser may progress along the same lines as in the following example:

Step 1: Gluing the laser microchip 4 in the holder piece 5;
Step 2: Placing the holder piece 5 in the first cylindrical housing 1.
Step 3: Inserting the focusing optics 6 into the holder 7 (alternatively, in FIG. 12, dimensions of focusing optics 26 is chosen so that it directly fits into housing 1 or into housing 22*a*).
Step 4: Placing the holder 7 in the first cylindrical housing 1 or in housing 2, at a predetermined distance from the microchip 4 with the help of a spacing washer 8 (alternatively placing focusing optics 26 at a predetermined distance from microchip 24 with spacing washer 28).

Step 5: Placing the fiber end holder 3 (ferrule) of the output end of the pump fiber in the second tubular housing 2.

Step 6: Bringing the two tubular housings 1 and 2 in contact.

Step 7: Adjusting the relative lateral position of the two housings 1 and 2 (e.g. by turning pump power on and optimizing the laser output or by passive alignment using mounting jigs).

Step 8: Adjusting the longitudinal position (distance with focusing optics) of the pump output fiber 3 in the same way.

Step 9 (optional): Inserting the output filter 27 in the first tubular housing 21.

Step 10: Fixing all elements in position (either by laser welding, brazing, gluing, screws, or a combination of those).

Step 11: Optimizing temperature of pump diode for maximum pump absorption (maximum laser power).

Step 12: Setting pump drive current and temperature of laser microchip (with TEC 10 or 30) to achieve target laser performance and stable operation.

Figure 11:
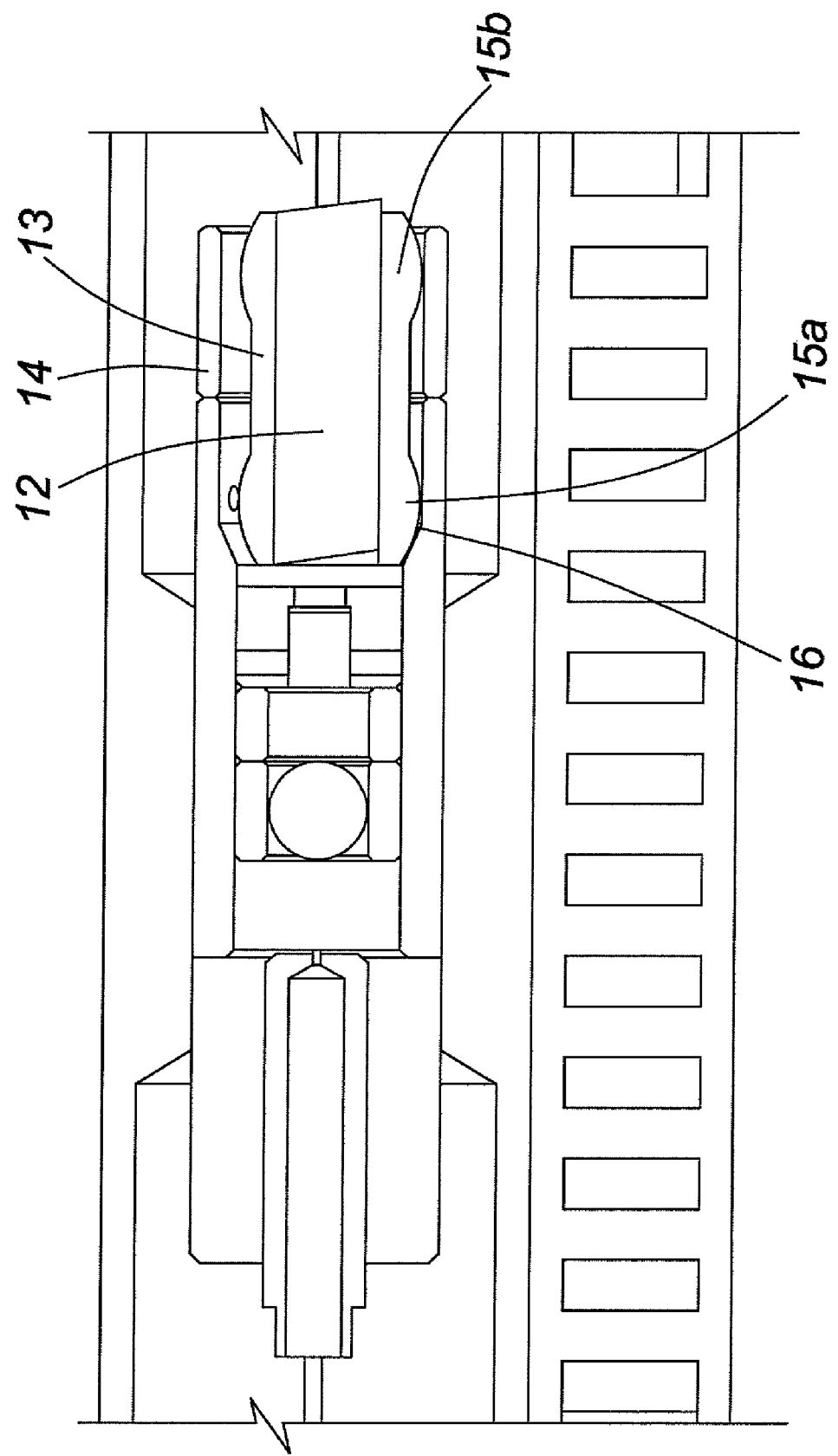
FIG. 11 is a cross-sectional view of an harmonic generation stage.

With reference to FIG. 11, to construct a laser with a harmonic generation stage, the five following additional steps listed below may be inserted in the assembly sequence between steps 9 and 10 above:

Step 13: placing the nonlinear crystal 12 in its holder piece 13.

Step 13b (optional): inserting a focusing optics 6b (not shown, but similar to 6) at a pre-determined distance from microchip 4 using a spacing washer similar to 8; another spacing washer can also be placed between focusing optics 6b and crystal holder 13.

Step 14: inserting the first end sphere 15a in the first tubular housing 1 in contact with the beveled washer 16.

Step 15: inserting the second sphere 15b into a third tubular housing 14.

Step 16: contacting the first and third tubular housings (1 and 14).

Step 17: adjusting the lateral position of the two tubular housings by optimizing the generated harmonic power.

Step 18: Fixing all added elements in position (either by laser welding, brazing, gluing, screws, or a combination of those)

For example, referring to FIG. 11, a holder 13 and a third tubular housing 14 can be made of aluminum, while the nonlinear crystal 12 comprises KTiOPO$_4$ with dimensions 2 mm×2 mm×7 mm.

An output fiber coupling can be incorporated optionally in a laser structure by inserting six additional steps between steps 9 and 10 above. They are similar to steps 3-8, the optimization being made on the laser power exiting from the output fiber.

Figure 13:
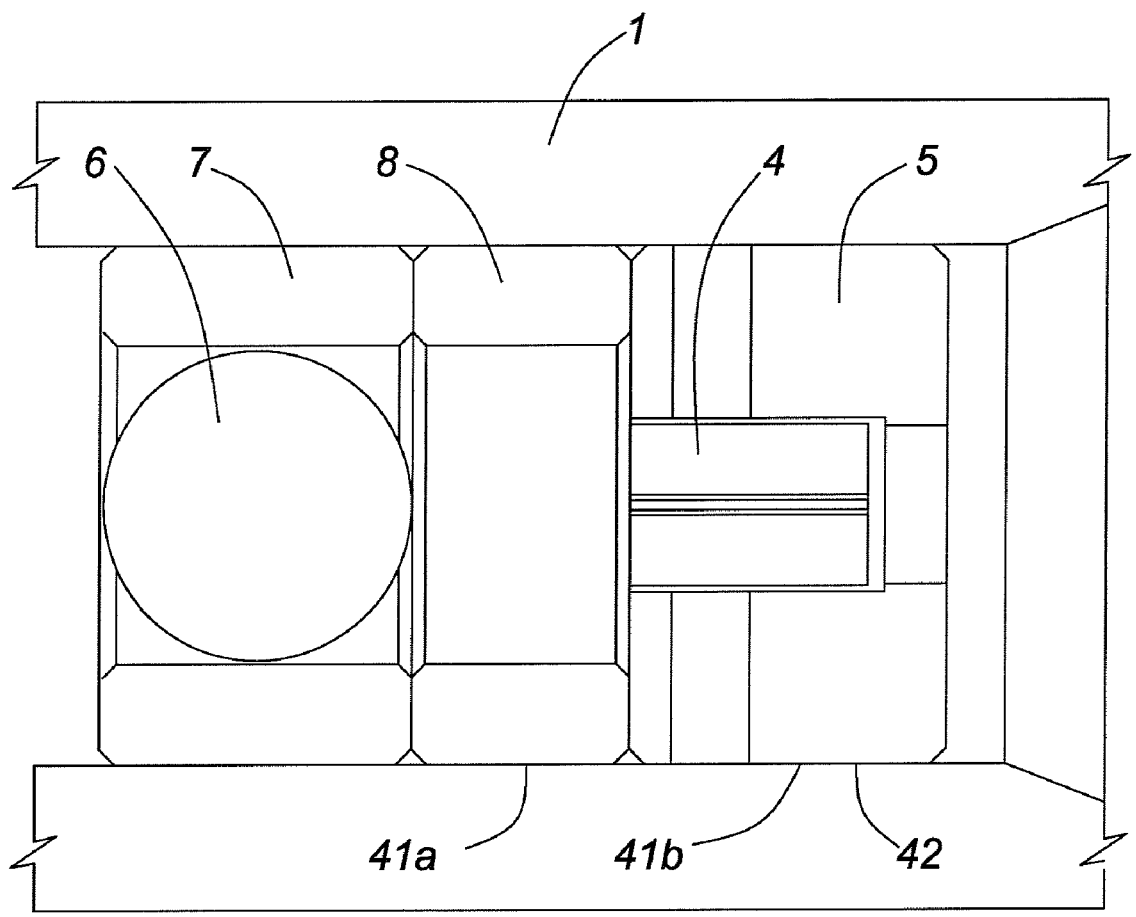
FIG. 13 shows cross-sectional detail of a mechanical mount for applying controlled stress to the microlaser.

Optionally, for achieving polarized laser output, anisotropic optical properties can be introduced by applying mechanical stress according to the following exemplary method. With reference to FIG. 13, for example, an additional step 1b may be inserted in the assembly sequence between steps 1 and 2 above:

Step 1b: applying a mechanical stress on the microchip 4 by using a holder 5 with a conically shaped outside surface 42, which is pressed against tubular housing 1 comprising two portions: a cylindrical hollow 41a and a conical hollow 41b, whose apex angle is larger than the conically shaped outside surface 42 of holder 5; adjusting the longitudinal position of holder 5 in housing 1 so that the mechanical stress applied on microchip 4 by holder 5 can be controlled.

Figure 12:
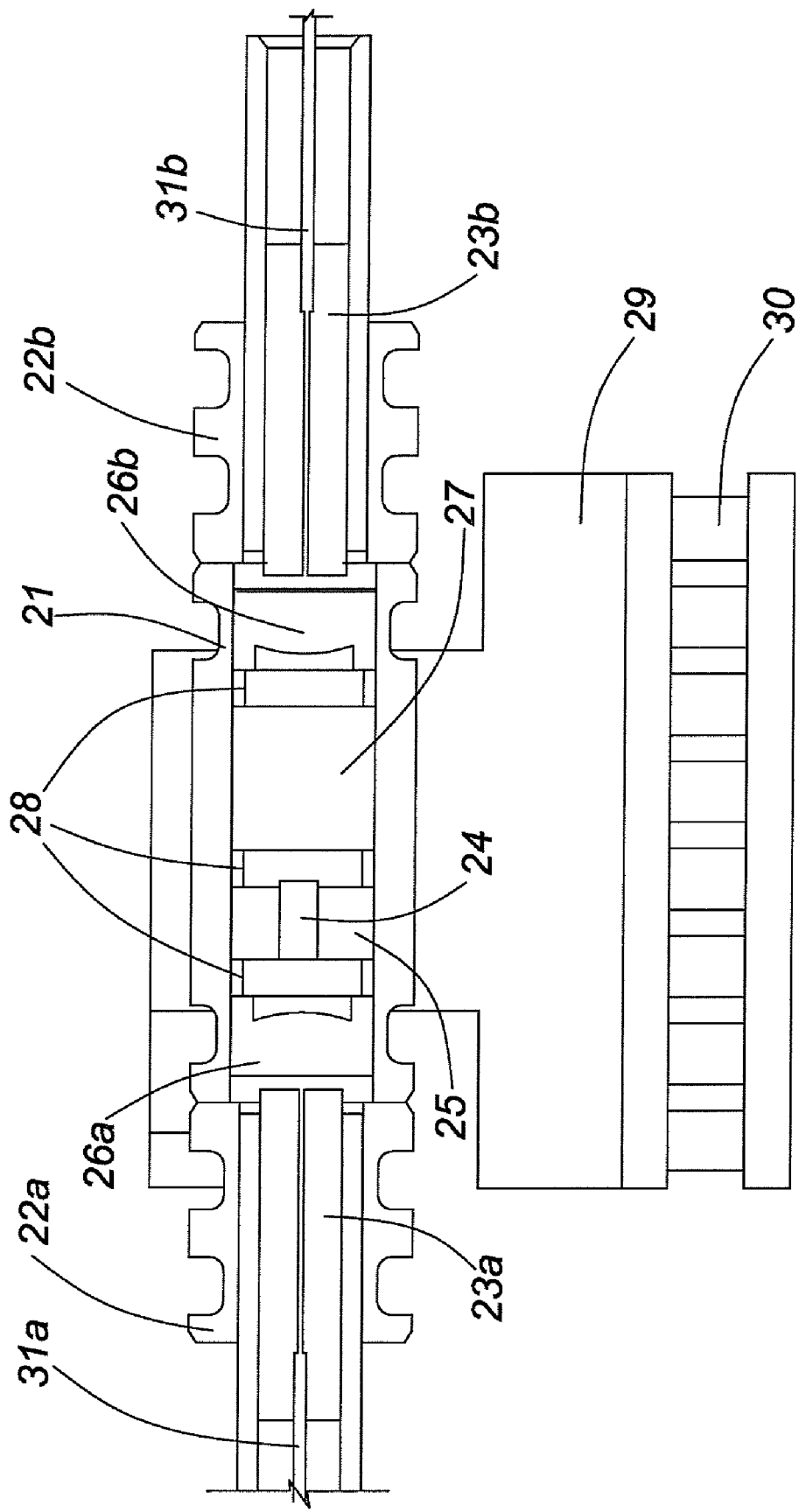
FIG. 12 is a cross-sectional view of an embodiment of a microlaser coupled to an exit fiber.

An alternative solution could also be obtained with the structure displayed on FIG. 12 where the holder 25 directly acts as a spring between housing 21 and microchip 24 to exert a given stress on microchip 24.

For example, referring to FIG. 13, all non-optical parts are made of aluminum with holder 5 dimensioned with length 2 mm, apex angle 1.4°, maximum outside diameter 3.38 mm; and the conical section 41b of tubular housing 1 has a taper angle 1.4°, maximum inside diameter 3.4 mm, minimum inside diameter 3.3 mm.

We claim:

1. A microchip laser package, for use with a fiber-coupled pump diode, comprising:

a first tubular housing having a longitudinal axis for receiving a ferrule holding an input fiber, which is optically coupled to an output of the fiber-coupled pump diode, wherein the first tubular housing has a first flat mating surface at an outermost end thereof, the first flat mating surface being oriented generally perpendicular to the longitudinal axis;

a second tubular housing for receiving a monolithic microchip laser, wherein the second tubular housing has a second flat mating surface at an outermost end thereof, the second flat mating surface being oriented generally perpendicular to the longitudinal axis; and wherein the first tubular housing and the second tubular housing abut each other at their first and second flat mating surfaces, respectively, in a non-overlapping configuration adjusting the lateral position of the second tubular housing relative to the longitudinal axis of the first tubular housing;

front focusing optics, disposed in first or second tubular housings, at a predetermine distance from a first end of the monolithic microchip laser, a laser head mount for supporting the second tubular housing; and temperature controlling means for controlling the temperature of the laser head mount;

wherein an end of the first tubular housing is attached to an end of the second tubular housing such that pump light from the fiber-coupled pump diode is focused onto a first end of the monolithic microchip laser by means of the front focusing optics.

2. The microchip laser package according to claim 1, further comprising:

an optical output filter accommodated within the second tubular housing and fixed at a predetermined distance from a second end of the monolithic microchip laser.

3. The microchip laser package according to claim 1, further comprising:

rear focusing optics accommodated within the second tubular housing and fixed at a predetermined distance from a second end of the monolithic microchip laser; and a third tubular housing for receiving a ferrule holding an output fiber, wherein the third tubular housing has a third flat mating surface at an outermost edge of an end thereof abutting a fourth flat mating surface on another end of the second tubular housing, for adjusting the relative lateral positions of the second and third tubular housings;

wherein the fourth flat mating surface of the second tubular housing is attached to the third flat mating surface of the third tubular housing such that a generated laser beam from the monolithic microchip laser is focused onto the output fiber by means of the rear focusing optics.

4. The microchip laser package according to claim 3, wherein the output fiber comprises a fiber amplifier.

5. A microchip laser package, for use with a fiber-coupled pump diode, comprising:
- a first tubular housing having a longitudinal axis for receiving a ferrule holding an input fiber, which is optically coupled to an output of the fiber-coupled pump diode, wherein the first tubular housing has a first flat mating surface on an end thereof;
- a second tubular housing for receiving a monolithic microchip laser, wherein the second tubular housing has a second flat mating surface on an end thereof abutting the first flat mating surface for adjusting the lateral position of the second tubular housing relative to the longitudinal axis of the first tubular housing;
- front focusing optics, disposed in first or second tubular housings, at a predetermined distance from a first end of the monolithic microchip laser,
- a laser head mount for supporting the second tubular housing; and
- a temperature controller for controlling the temperature of the laser head mount;
- a nonlinear crystal mounted in a tubular mount with a first and second end, wherein the first end is inserted into the second tubular housing, in contact with a beveled washer;
- a third tubular housing for receiving the second end of the tubular mount;
- wherein an end of the first tubular housing is attached to an end of the second tubular housing such that pump light from the fiber-coupled pump diode is focused onto a first end of the monolithic microchip laser by means of the front focusing optics; and
- wherein an end of the second tubular housing is attached to an end of the third tubular housing such that relative lateral movement of the two housings is converted into angular displacement of the nonlinear crystal.

6. An assembly process for a microchip laser package comprising:
a) affixing a monolithic microchip laser in a chip holder;
b) placing a first ferrule holder of an output end of a pump fiber into a first tubular housing, the first tubular housing having a longitudinal axis;
c) placing the chip holder into a second tubular housing;
d) placing front focusing optics in the second tubular housing at a predetermined distance from the monolithic microchip laser;
e) bringing ends of the first and second tubular housings and into contact;
f) adjusting relative position of the first and second tubular housings laterally relative to the longitudinal axis;
g) adjusting the longitudinal distance from an end of the input fiber mounted in the first ferrule holder to the front focusing optics;
h) fixing the first and second tubular housings and the first ferrule holder in position by one or more of laser welding, brazing, gluing and screws;
i) adjusting temperature of a pump diode to increase pump absorption corresponding to desired laser output power; and
j) setting a pump drive current and temperature of the laser microchip by means of a thermoelectric element to achieve desired performance and stable operation of laser.

7. The assembly process according to claim 6, further comprising the following steps inserted between steps h) and i):
- affixing a nonlinear crystal into a tubular mount;
- bringing a first end of the tubular mount into contact with a beveled washer inside the second tubular housing;
- inserting a second end of the tubular mount into a third tubular housing;
- bringing the second and third tubular housings into end contact;
- adjusting the relative position of the second and third tubular housings laterally relative to the longitudinal axis to set an angle of the nonlinear crystal such that a desired level of the generated harmonic power is achieved; and
- fixing the tubular mount, the second tubular housing and the third tubular housing in position by one or more of laser welding, brazing, gluing and screws.

8. The assembly process according to claim 6, further comprising the following steps inserted between steps h) and i):
- placing rear focusing optics in the second tubular housing at a predetermined distance from the monolithic microchip laser with the aid of a spacing washer;
- placing a second ferrule holder of an input end of an output fiber into a third tubular housing;
- bringing the second and third tubular housings into end contact;
- adjusting the relative position of the second and third tubular housings laterally relative to the longitudinal axis such that a desired output coupling to the output fiber is achieved;
- adjusting the longitudinal distance from the second ferrule holder to the rear focusing optics such that a desired output coupling to the output fiber is achieved; and
- fixing the second and third tubular housings and the second ferrule holder in position by one or more of laser welding, brazing, gluing and screws.

9. The assembly process according to claim 6, further comprising the following step inserted between steps b) and c):
- applying a mechanical stress to the monolithic microchip laser by means of the chip holder, whose outside conical surface has a smaller apex angle than a conical hollow in the first tubular housing such that adjusting a longitudinal position of an annular holder along the longitudinal axis in the first tubular housing a mechanical stress is applied to the monolithic microchip laser.

10. The assembly process according to claim 6, further comprising the following step inserted between steps h) and i):
- inserting an output filter in the second tubular housing.

11. The assembly process according to claim 6, further comprising the following steps inserted between steps c) and d):
- inserting a ball lens into a ball lens holder to form front focusing optics.

12. The assembly process according to claim 6, wherein in step a) the monolithic microchip laser is press-fit into the chip holder such that through elastic spring action, mechanical stress is applied to the monolithic microchip laser for achieving polarized laser output.

13. The assembly process according to claim 6, wherein in step f) the pump power is turned on and the adjustment of relative lateral position of the first and second tubular housings is performed such that a desired laser output is achieved.

14. The assembly process according to claim 6, wherein in step g) the pump power is turned on and the adjustment of the distance from an end of the input fiber mounted in the ferrule holder to the front focusing optics is performed such that a desired laser output is achieved.

15. The microchip laser package according to claim 5, wherein the ends of the tubular mount have a spherical outer surface.

16. The assembly process according to claim 7, further comprising:
- placing rear focusing optics in the third tubular housing at a predetermined distance from the nonlinear crystal with the aid of a spacing washer;
- placing a second ferrule holder of an input end of an output fiber into a fourth tubular housing;
- bringing the third and fourth tubular housings into end contact;
- adjusting the relative position of the third and fourth tubular housings laterally relative to the longitudinal axis such that a desired output coupling to the output fiber is achieved;
- adjusting the longitudinal distance from the second ferrule holder to the rear focusing optics such that a desired output coupling to the output fiber is achieved; and
- fixing the third and fourth tubular housings and the second ferrule holder in position by one or more of laser welding, brazing, gluing and screws.

17. A microchip laser package, for use with a fiber-coupled pump diode, comprising:
- a first tubular housing having a longitudinal axis for receiving a ferrule holding an input fiber, which is optically coupled to an output of the fiber-coupled pump diode, wherein the first tubular housing has a first flat mating surface on an end thereof;
- a second tubular housing for receiving a monolithic microchip laser, wherein the second tubular housing has a second flat mating surface on an end thereof abutting the first flat mating surface for adjusting the lateral position of the second tubular housing relative to the longitudinal axis of the first tubular housing;
- front focusing optics, disposed in first or second tubular housings, at a predetermined distance from a first end of the monolithic microchip laser,
- a laser head mount for supporting the second tubular housing; and
- a temperature controller for controlling the temperature of the laser head mount;
- wherein an end of the first tubular housing is attached to an end of the second tubular housing such that pump light from the fiber-coupled pump diode is focused onto a first end of the monolithic microchip laser by means of the front focusing optics; and
- wherein the first and second flat mating surfaces are at an acute angle to the longitudinal axis for providing at least one of transverse alignment and clocking alignment.

18. The microchip laser package according to claim 5, further comprising:
- an optical output filter accommodated within the second tubular housing and fixed at a predetermined distance from a second end of the monolithic microchip laser.

* * * * *

UNITED STATES PATENT AND TRADEMARK OFFICE
CERTIFICATE OF CORRECTION

PATENT NO. : 7,648,290 B2  Page 1 of 1
APPLICATION NO. : 11/533000
DATED : January 19, 2010
INVENTOR(S) : Feve et al.

It is certified that error appears in the above-identified patent and that said Letters Patent is hereby corrected as shown below:

Col. 12, Claim 1, line 29, "configuration adjust-" should read -- configuration for adjust- --

Col. 12, Claim 1, line 38, "temperature controlling means" should read -- a temperature controller --

Signed and Sealed this
Twenty-sixth Day of July, 2011

David J. Kappos
*Director of the United States Patent and Trademark Office*